Dec. 26, 1933.  K. M. SIMPSON  1,940,977
METALLURGICAL PROCESS AND APPARATUS
Filed March 8, 1932   4 Sheets-Sheet 1

Inventor
Kenneth M. Simpson

By Bacon & Thomas
Attorneys

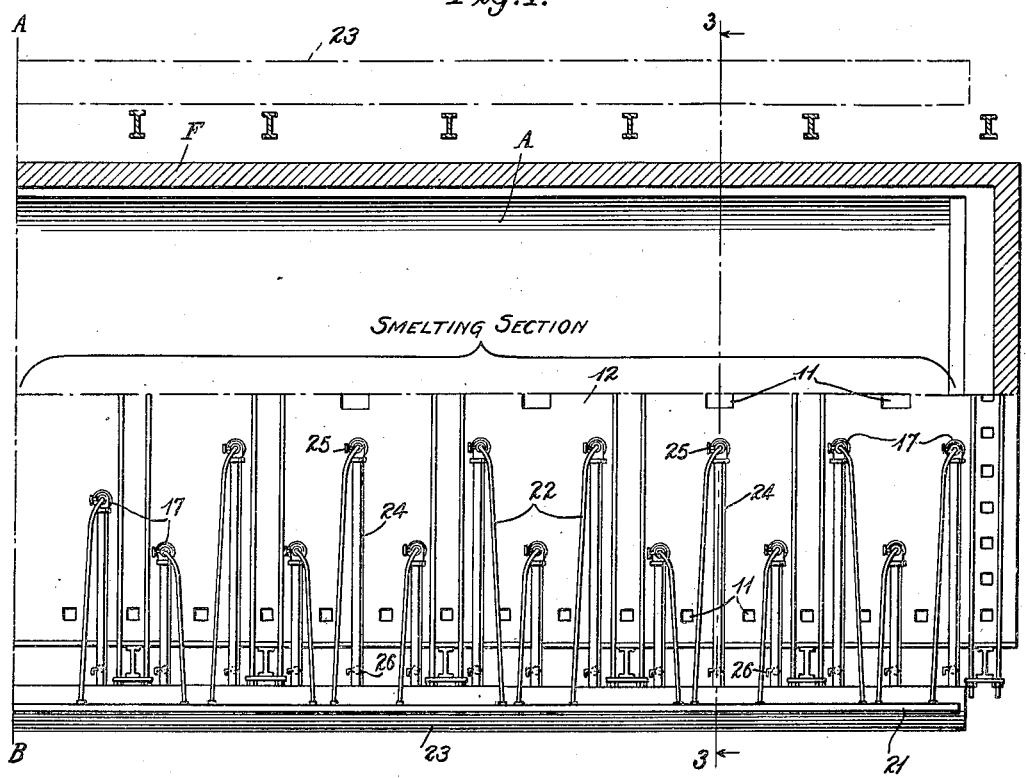
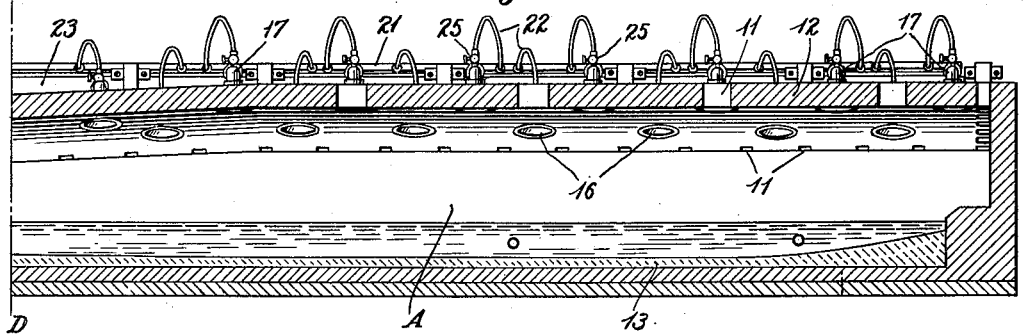

Dec. 26, 1933.    K. M. SIMPSON    1,940,977
METALLURGICAL PROCESS AND APPARATUS
Filed March 8, 1932    4 Sheets-Sheet 3

Inventor
Kenneth M. Simpson

By Bacon & Thomas
Attorneys

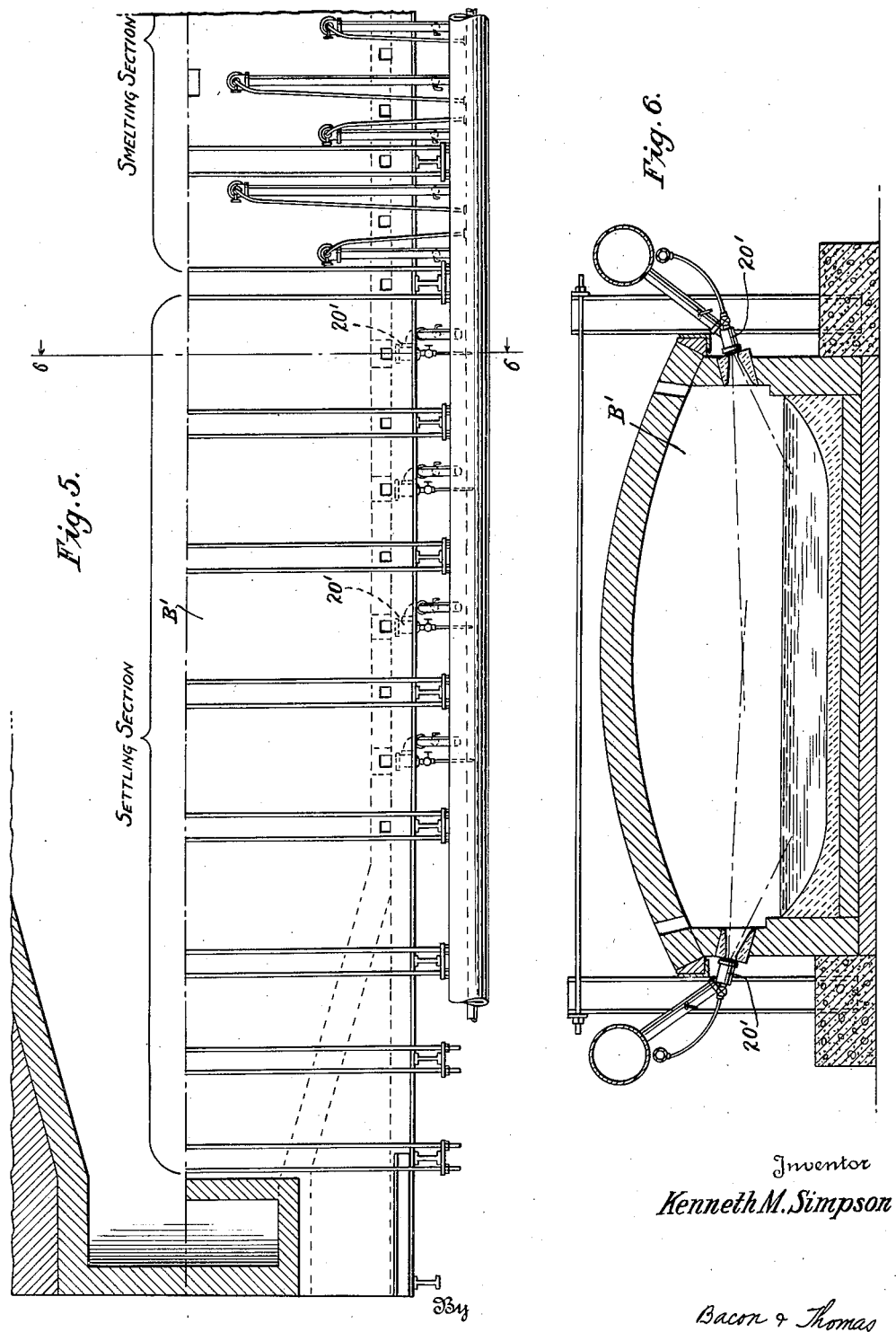

Patented Dec. 26, 1933

1,940,977

UNITED STATES PATENT OFFICE 1,940,977

METALLURGICAL PROCESS AND APPARATUS

Kenneth M. Simpson, New York, N. Y., assignor to International Chromium Process Corporation, New York, N. Y., a corporation of Delaware Application March 8, 1932. Serial No. 597,587

3 Claims. (Cl. 75—62)

My invention relates to a metallurgical process and apparatus, and more particularly has reference to certain improvements in the operation of smelting reverberatory furnaces.

In the smelting in reverberatory furnaces of copper ores and concentrate and other materials yielding slag and matte of not greatly different specific gravities, there is usually a considerable loss of metal in the slag, it being impossible to settle all of the metal out of the slag in the furnace and a substantial proportion of the metal being therefore withdrawn from the furnace in admixture with the slag. In the case of copper ores and concentrates, the smelting in reverberatory furnaces ordinarily results in a loss of about 2% copper in the slag even under the best separating conditions prevailing in a reverberatory furnace. In copper blast furnace operation, however, the loss of copper due to retention of matte in the slag, is much lower than in reverberatory furnace operation and is usually less than one-half of one percent. This difference in copper loss between blast furnace smelting and reverberatory furnace smelting, is due to the fact that higher temperatures are employed in blast furnaces.

It is an object of my invention to provide a reverberatory furnace operation characterized by the low metal losses of blast furnace operation, while still possessing all the advantages of reverberatory smelting.

Smelting reverberatory furnaces of modern practice are about 120 feet in length and comprise a smelting section and a settling section. These sections are not necessarily physically separated from each other, but distinctly different operations are performed therein. The smelting section usually constitutes about the first 60 feet of the furnace, and is provided with sloping side walls, the ore or concentrate being fed thereto through openings in the roof of the furnace along the side walls or along the center. In present practice, the material on the hearth of the smelting section is subjected to the action of an oil flame or a coal dust flame, a burner or burners being placed at the end of the smelting section of the furnace. The flames are directed horizontally and travel longitudinally through the furnace immediately beneath the furnace roof. The highest temperature is developed in the first 60 feet, or in the smelting section of the furnace, and the ore is reduced therein to matte and slag by the heating action of the flame. The operation is continuous, and the molten matte and slag flow into the settling section comprising the remaining 60 feet of the furnace where a separation of matte from the slag takes place.

As already indicated, one of the problems of this type of smelting operation is the substantial loss of copper or other metal in the slag, this being due to the fact that the slag is not sufficiently fluid under the conditions prevailing in the settling section of a reverberatory furnace to permit the complete separation of two materials which do not have a great difference in specific gravities, as in the case with copper matte and copper slag. In present practice, the slag and matte are retained in the settling section long enough to permit the best separation possible under the conditions existing therein, the matte being tapped from time to time as required through a hole in a side wall of the furnace into a ladle and is taken to a converter for further treatment. The slag is withdrawn to waste from the end of the furnace, and ordinarily contains about 2% copper.

According to the process of my invention, a positive heating is applied to the slag and matte in the settling section of the reverberatory furnace, this heating being controlled independently of the heating of the smelting section and being adequate to maintain the slag in a very fluid condition in order to permit the matte to settle therefrom. This positive and independent heating of the settling section is preferably effected by the direct application or impingement of flame upon the surface of the molten material. The heating of the smelting section is also preferably by flame impingement, but here the impinging flame covers substantially the entire surface of the charge, whereas the independently controlled flame impingement in the settling section is over a lesser area but sufficient to maintain the slag in fluid state. By operating a smelting reverberatory furnace in this manner, a substantially metal-free slag can be withdrawn from the furnace while substantially all of the metal content of the ore is recovered in the matte.

For a more detailed understanding of my invention, reference will be had to the accompanying drawings, wherein:

Figures 1 and 1a represent a plan view, partly in section, of the elongated reverberatory smelting furnace;

Figures 2 and 2a constitute a vertical sectional view through the furnace of Figures 1 and 1a;

Figure 3 is a section through the smelting portion of the furnace, and taken on the line 3—3 of Figure 1a;

Figure 5 is a partial plan and sectional view of a furnace similar to that of Figures 1 and 1a, but having a modified form of settling section; and Figure 6 is a sectional view on the line 6—6 of the modified settling chamber of Figure 5.

Figure 1:
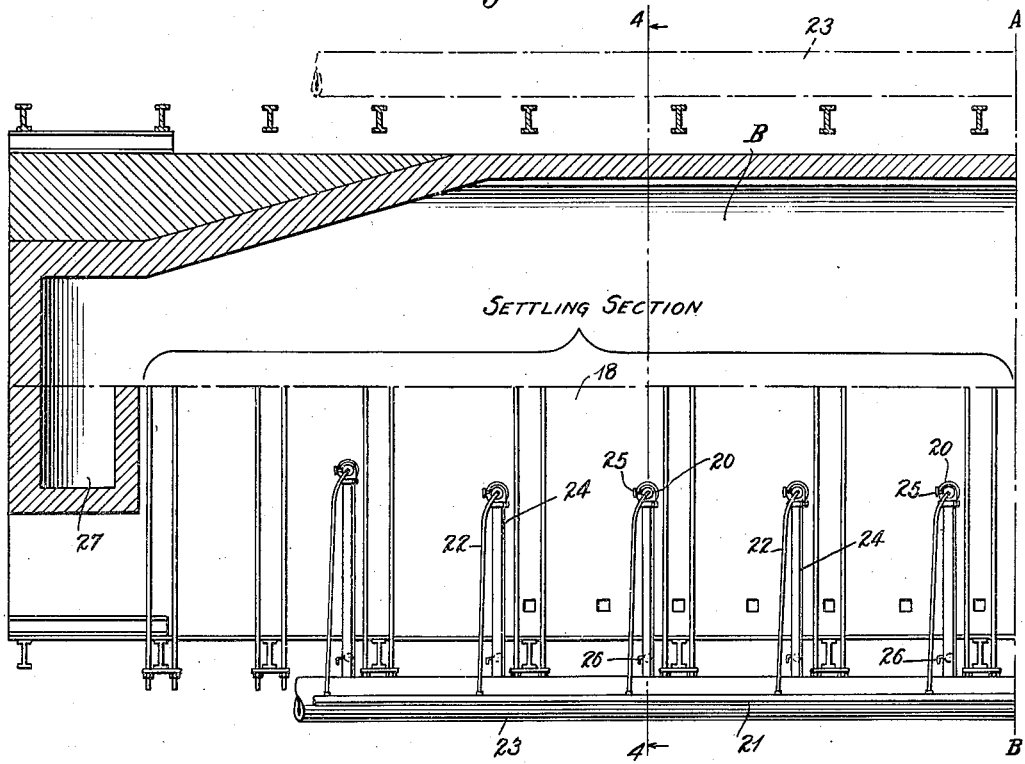

Referring more particularly to the drawings, the elongated reverberatory furnace F comprises the smelting section A and the settling section B. These sections are distinguished from each other by the different operations performed therein, rather than by an actual physical separation, although they may constitute separate furnaces or furnace compartments having a restricted communicating passageway therebetween.

The charge is introduced to smelting section A from hoppers 10 through spaced openings 11 in furnace roof 12, and is deposited upon hearth 13 of the furnace. A slag outlet 14 and a matte outlet 15 are provided adjacent the opposite end of the furnace in the settling section.

The furnace roof 12 of the smelting section is provided with spaced apertures 16 over a substantial area, an independent burner 17 projecting into each of the apertures. The roof 18 of the settling section is also apertured as at 19, but to a lesser extent than roof 12 of the smelting section. Apertures 19 are similarly each provided with an independent burner 20 adapted to project flame into the settling section against the material therein. As illustrated in the drawings, smelting section A is provided with three times as many burners as settling section B and assuming the furnace to be 120 feet in length, the burners 17 would be disposed over the first 60 feet, or smelting section of the furnace, while the burners 20 would be disposed over the remaining 60 feet, or settling section of the furnace.

Figure 2:
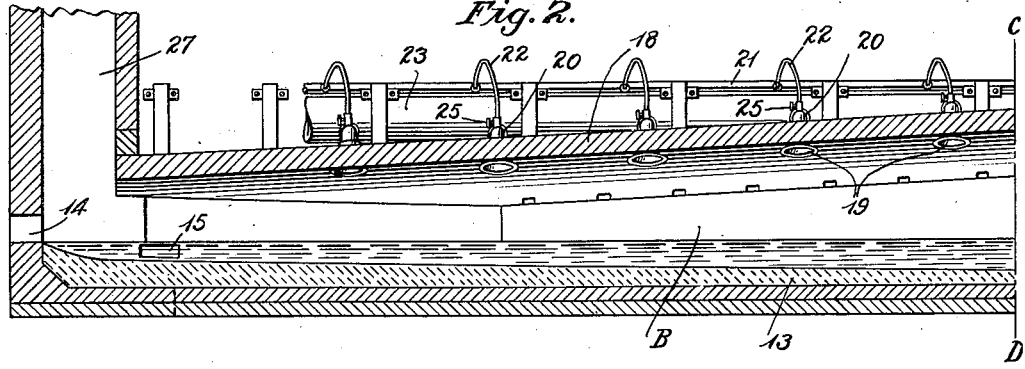
Figure 3:
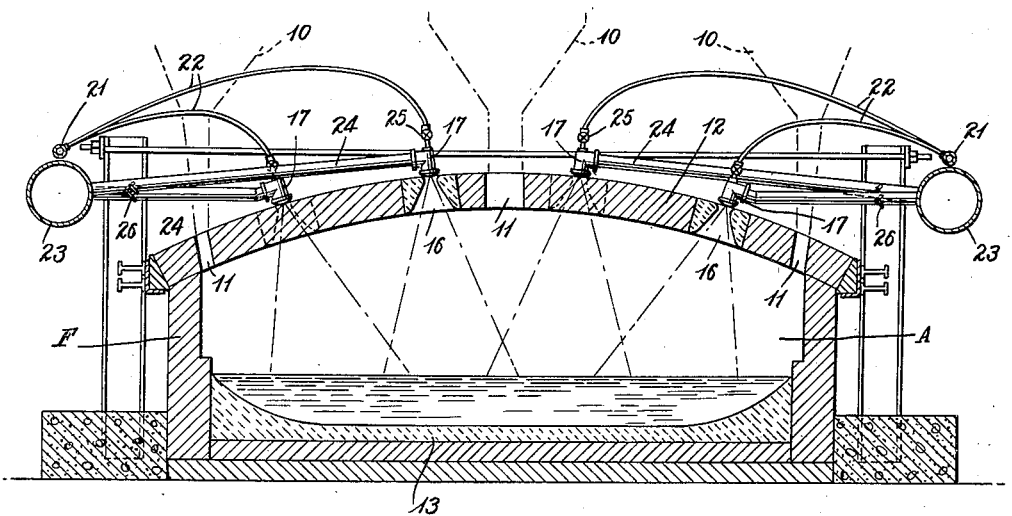
Figure 4:
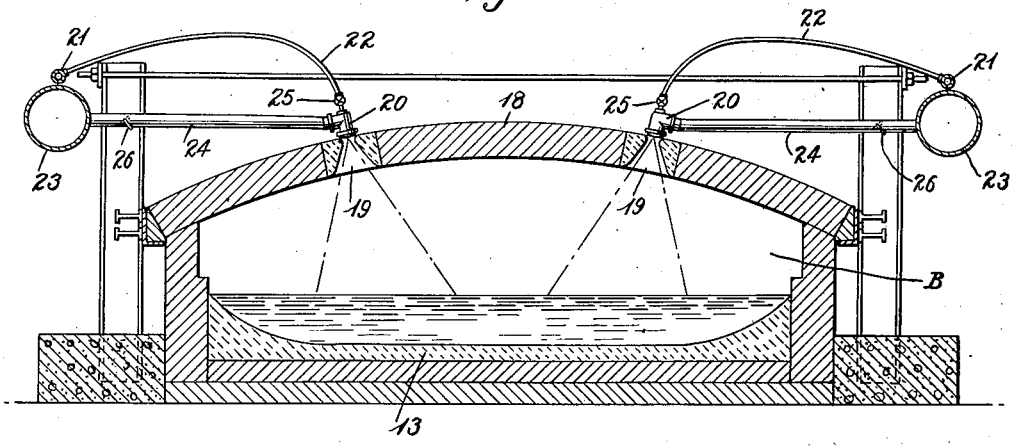
Figure 4 is a sectional view through the settling portion of the furnace, taken on the line 4—4 of Figure 1.

The burners 17 and 20 are supplied with fuel, such as oil, gas or powdered coal, from manifolds 21 through connecting lines 22. Air is supplied to the individual burners 17 and 20 from air manifolds 23 through connecting pipes 24. Each of the fuel lines 22 is provided with a valve 25 and each of the air pipes 24 is provided with a damper 26 whereby the individual burners may be independently controlled. The combustion gases flow longitudinally through the furnace and are discharged through the flue 27. The modified furnace structure of Figures 5 and 6 is in all respects similar to that of Figures 1 to 4 with the exception that the burners 20' instead of projecting through the roof of settling section B', are angularly disposed in the side walls of the settling section to project flame at an angle onto the surface of the molten mass.

In operation, the material to be treated, such as copper concentrate, is charged onto the hearth of the smelting section of the furnace and is smelted therein by the action of burners 17 positioned above the hearth. The method of heating in the smelting section of the furnace is preferably that of my prior Patent No. 1,812,563, June 30, 1931, according to which downwardly directed short intense flame is impinged at substantial velocity over substantially the entire surface of the charge on the hearth. Such flame is generated in the upper portion of the smelting section over a substantial area, and is directed downwardly with considerable force by means of the burners 17. By heating in this manner, the flame thoroughly penetrates the charge and an extremely rapid and highly efficient heating is obtained.

The material to be treated may be continuously or intermittently supplied to the furnace, and the molten mass flows along the hearth from smelting section A into settling section B. Here the molten material is subjected to independently controlled heating, preferably by flame impingement, from burners 20 or 20' disposed respectively in the roof and side walls of the settling section. This independently controlled heating is less intense than that in the smelting section and the flame need not cover the entire or major portion of the mass as in the smelting section. However, the degree of heating in the settling section is such as to maintain the slag in a very fluid state in order to permit a substantially complete settling out of the matte. In the case of copper concentrate, with a temperature in the neighborhood of 1600° C. in the smelting section, a temperature of about 1300° C. may be independently maintained in the settling section to effect a substantially complete separation of matte from slag. Stratification of the matte and slag takes place as the molten mass flows along the hearth of the settling section while subjected to the flame impingement, the separated matte being withdrawn through outlet opening 15. The slag is withdrawn from the end of the furnace through outlet 14 and will be found to contain less than one-half of one percent copper.

It will thus be seen that by means of the burners 20 or 20', controlled independently of those in the smelting section, it is possible to elevate the slag temperature in the settling section of a reverberatory furnace to a point approaching that of blast furnace slag to obtain the more complete separation of blast furnace operation in smelting reverberatory furnaces.

Having described my invention, I claim:

1. In the treatment of sulphur-bearing ores and concentrates in smelting reverberatory furnaces, the method which comprises introducing the charge to the smelting section of the furnace, smelting the charge by projecting flame in an unobstructed path downwardly from the upper portion of the furnace and impinging the same at high velocity onto the major portion of the entire surface of the charge in the smelting section, flowing the resultant slag and matte into the settling section of the furnace, applying directly to the surface of the material in the settling section independently controlled heat of lesser intensity than is applied to the charge in the smelting section but sufficient to maintain the slag in fluid condition and at a lower temperature than that of the smelting section, stratifying the slag and matte in the settling section, and separately removing the matte and slag from the furnace.

2. In the treatment of sulphur-bearing ores and concentrates in smelting reverberatory furnaces, the method which comprises introducing the charge to the smelting section of the furnace, smelting the charge by projecting flame in an unobstructed path downwardly from the upper portion of the furnace and impinging the same at high velocity onto the major portion of the entire surface of the charge in the smelting section, flowing the resultant slag and matte into the settling section of the furnace, maintaining the slag in fluid condition and at a temperature substantially below that maintained in the smelting section by impinging flame against the surface of the material in the settling section over a smaller area than in the smelting section, stratifying the slag and matte in the settling section, and separately removing the matte and slag from the furnace.

3. In the treatment of copper-bearing ores and concentrates in smelting reverberatory furnaces, the method which comprises introducing the charge to the smelting section of the furnace, smelting the charge by projecting flame in an unobstructed path downwardly from the upper portion of the furnace and impinging the same at high velocity onto the major portion of the entire surface of the charge in the smelting section, flowing the resultant slag and matte into the settling section of the furnace, applying directly to the surface of the material in the settling section independently controlled heat of lesser intensity than is applied to the charge in the smelting section but sufficient to maintain the slag in fluid condition and at a lower temperature than that of the smelting section, stratifying the slag and matte in the settling section, and separately removing the matte and slag from the furnace.

KENNETH M. SIMPSON.